Dec. 21, 1965  M. H. WESTBROOK  3,224,322
OPTICAL GAUGING SYSTEM
Filed July 31, 1961  2 Sheets-Sheet 1
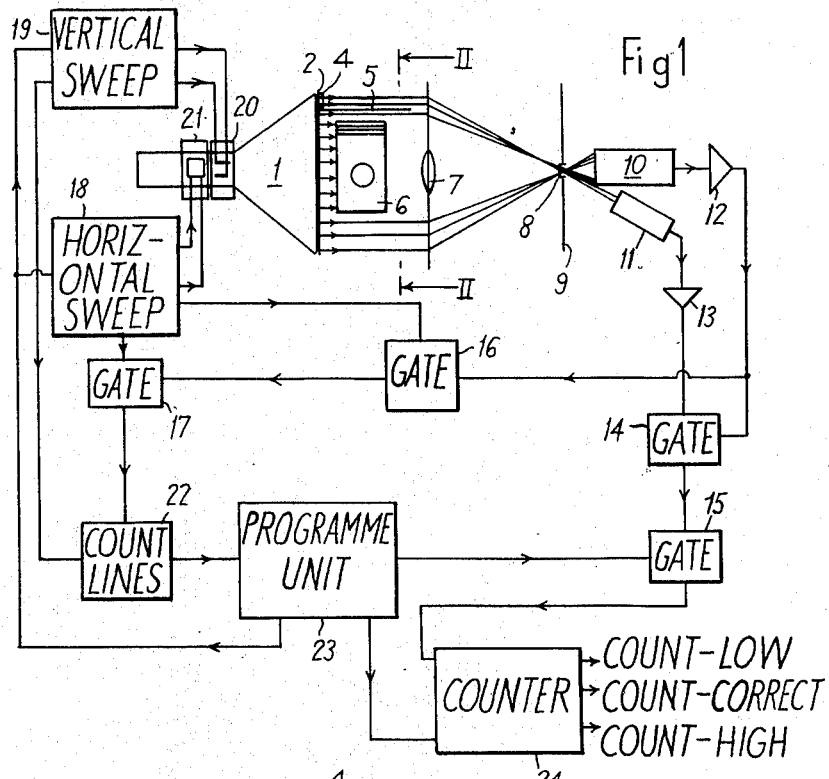
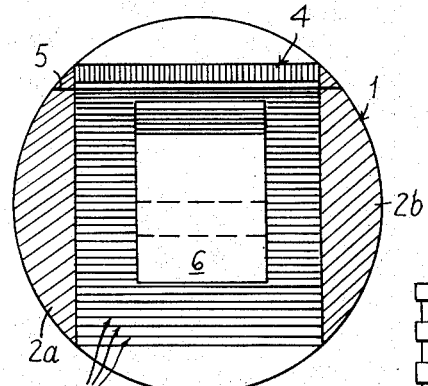
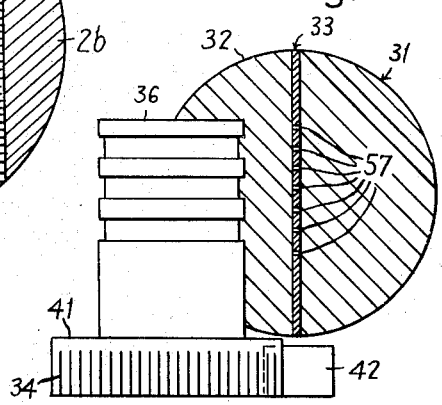
Inventor
M. H. WESTBROOK
By
Holcombe, Wetherill & Brisebois
Attorneys Dec. 21, 1965 M. H. WESTBROOK 3,224,322
OPTICAL GAUGING SYSTEM
Filed July 31, 1961 2 Sheets-Sheet 2

Inventor
M. H. WESTBROOK
By
Holcombe, Wetherill + Brisebois Attorneys

United States Patent Office 3,224,322
Patented Dec. 21, 1965

3,224,322
OPTICAL GAUGING SYSTEM
Michael Hereward Westbrook, Leamington Spa, England, assignor to Associated Engineering Limited, Leamington Spa, England, a British company
Filed July 31, 1961, Ser. No. 127,941
Claims priority, application Great Britain, Aug. 5, 1960, 27,230/60
18 Claims. (Cl. 88—14)

The present invention relates to an optical gauging system for gauging engineering components and particularly for accurately gauging a multiplicity of dimensions of a component.

The invention consists in an optical gauging system for engineering components wherein relative movement is effected between a light beam and a component to be gauged so that the light beam traverses the dimension to be gauged and a train of electrical pulses is produced in timed relation to the speed of said relative movement whereby a predetermined number of pulsse is produced per unit of movement and wherein means are provided for comparing a number of the pulses produced during the relative movement between the light beam and the component, said number varying as a function of the dimension to be gauged, with a predetermined number of pulses and any divergence, in excess of allowable tolerance limits, from a predetermined ratio between said number of produced pulses and said predetermined number producing an indication that the component is faulty and/or producing automatic rejection of the component and/or control of a machine making the component.

The component to be gauged is preferably positioned during the gauging operation between two screens each having a slit and acting as a collimator for the light beam which passes from a light source arranged behind one of the screens through the slits to a light sensitive device arranged behind the other screen. The light beam is cut off from the light sensitive device during the traversal of the dimension of the component to be gauged and said light sensitive device controls a gate device which in turn controls the feeding of pulses to a counter device during the period when the light beam is cut off from the light sensitive device.

The light beam is preferably derived from the light spot produced by a cathode ray beam and according to a feature of the invention, in addition to the relative movement between the light beam and the component in the direction of the dimension to be gauged, the light beam is also deflected at right angles to the said direction whereby a multiplicity of dimensions of the component may be gauged substantially simultaneously. For example the component may be stationary and the beam of a cathode ray tube may be deflected by both vertical and horizontal sweep waveforms to produce a scanning raster by means of which gauging may be effected substantially simultaneously at different levels corresponding to different scanning lines. Alternatively, the cathode ray beam may be deflected in a line perpendicular to the dimensions to be gauged, the component being moved mechanically in a direction transverse to the scanning line, whereby, again, a multiplicity of dimensions may be gauged substantially simultaneously at different positions along the scanning line.

According to a further feature of the invention, the number of pulses produced while the light beam is traversing a dimension of the component to be gauged is detected by producing a fixed number of pulses during each complete cycle of relative movement between the component and the light beam in the direction of the dimension to be gauged, and gating out the pulses produced while the light beam is cut off from the light sensitive device by the component interposed therebetween. A predetermined number of pulses corresponding to the required dimension may be added to the number of pulses passed by the gate during the complete scanning sweep across the dimension to be gauged, for example during the fly-back period. If the total count is equal to said fixed number of pulses produced during a complete scanning sweep, or does not differ therefrom by an amount exceeding that corresponding to the permissible tolerance on the dimension, the component dimension will be within the permitted limits.

Alternatively the number of pulses produced whilst the light beam is cut off from the light sensitive device by the component may be directly compared with a predetermined number of pulses representing the desired dimension.

In order that the invention may be more clearly understood, reference will now be made to the accompanying drawings, in which:

FIGURE 1 is a diagram of one embodiment intended for gauging a stationary component.

FIGURE 2 is a diagrammatic view along the line II—II in FIGURE 1.

FIGURE 4 is a diagrammatic view of the line IV—IV in FIGURE 3, and

Figure 3:
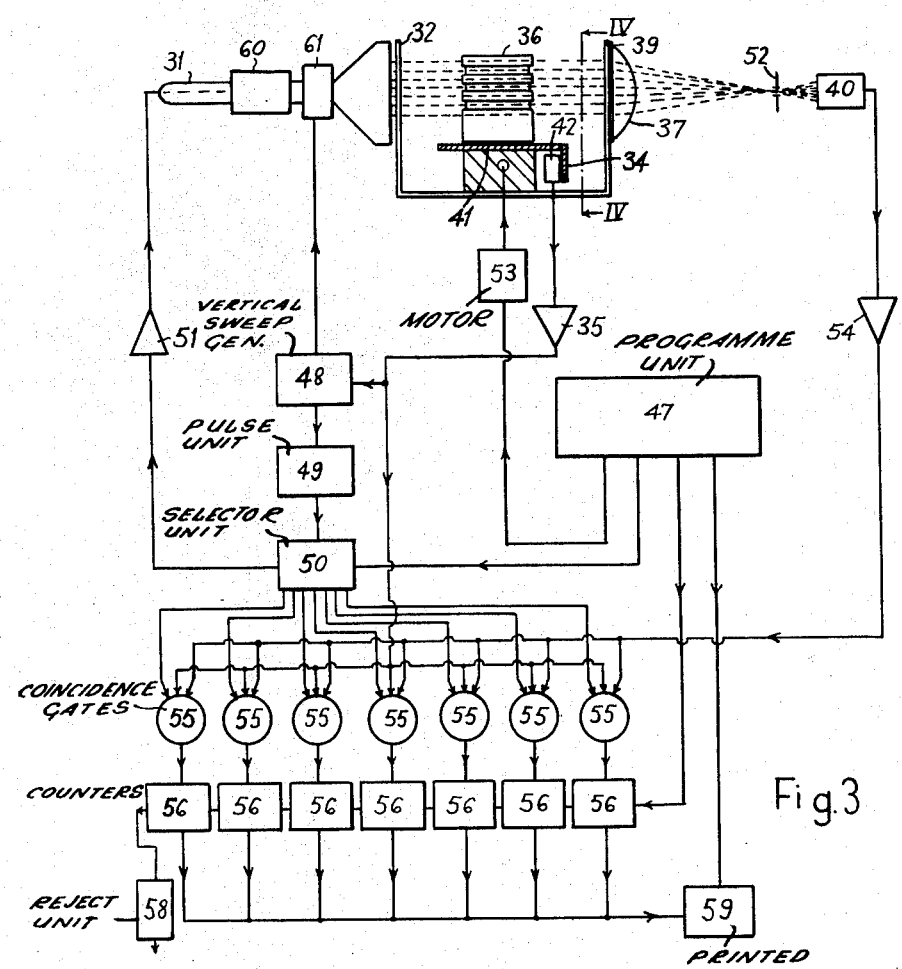
FIGURE 3 is a diagram of a further embodiment intended for gauging a moving component.

Referring to FIGURES 1 and 2, the system to be described is intended to provide gauging of a static component, such as a piston. The electron beam of a cathode-ray tube 1 is caused to produce a spot of light moving in a series of horizontal lines 3 displaced in a vertical direction, known as a raster, on a fluorescent screen 2. The deflection of the electron beam is effected by the sweep generators 18, 19 and associated deflecting coils 20 and 21. The cathode ray tube is also provided with a second electron beam which is controlled in its horizontal movement in synchronism with the first beam, but is controlled separately in the vertical direction. This second beam is caused to describe a single repeated line scan behind a graduated scale or grating 4. The two areas of the screen in which these beams operate are separated from each other by an optical screen 5. Opaque screens 2a and 2b define the limits over which the light beams are visible and the limits of the scale or grating 4.

The component to be gauged, represented by a piston 6, is placed between the screen 2 and a convex lens 7 behind which, at a distance equal to the focal length of the lens 7, is placed a screen 9 with a hole or vertical slit 8 at the focus of the lens. This hole or slit has a similar dimension in the horizontal direction to the size of the spots of light on the screen of the cathode ray tube 1 and thus only parallel or near parallel light from the spots in any part of the field of the lens can pass through the hole or slit 8. Behind the hole is arranged a light sensitive device consisting of a photomultiplier 10 to receive parallel light from the first light spot traversing the screen in a raster, and also a second photomultiplier 11 receiving parallel light from the second light spot traversing the scale or grating 4.

As the spot of light producing the raster on the screen of the cathode ray tube passes behind the component 6, the light reaching the photomultiplier 10 is cut off, the sharpness of the cut off and thus the measuring accuracy being dependent on the spot size, the optical accuracy of the lens 7 and the size of the hole or slit 8 in the horizontal direction. At the same time, the second spot of light is traversing the scale or grating 4 and thus producing a series of interruptions of the light reaching the photomultiplier 11, whose output provides calibration pulses defining the distance travelled across the face of the tube by both light spots.

The signal from photomultiplier 10 is amplified by amplifier 12 and fed to the gate 14 which it holds open as long as light reaches photomultiplier 10. This gate passes (when open) the calibration pulses received from photomultiplier 11 and amplified by amplifier 13 and feeds them to the further gate 15 which is only opened when the vertical scan of the raster has reached the level on the piston at which a measurement is required. This is controlled by means of the programme unit 23, which is fed with information via the gates 16 and 17, which open when the top of the piston has been reached by the scanning raster, and which is also fed by the counter 22 which determines the level down the piston, defined by counting the number of scanning lines, at which scanning is taking place at any instant. The programme unit 23 then opens the gate 15 and the counter 24 counts the number of calibration pulses between the two opaque screens 2a and 2b less the number of pulses occurring during the time the scanning spot is obscured by the piston at the level at which a measurement is required.

In the programme unit 23 the number of pulses corresponding to the correct value for the dimension of interest is recorded, and during the blanking and fly-back periods of the line scan, these predetermined pulses are generated by the programme unit 23 and added to the counter 24. If the predetermined number of pulses added is equal to the number of pulses occurring during the time the scanning spot is obscured, the output from the counter 24 will be brought up to the total number for the complete scan between screens 2a to 2b. A lower count on the counter indicates that the relevant dimension is greater than it should be and a higher count on the counter indicates the dimension is less than its correct value.

This information may then provide control of a reject indicator or trap of orthodox type or may be used in a visual display on a cathode ray tube display device, to indicate the exact location of the error by means of a brightening signal.

Figure 5:
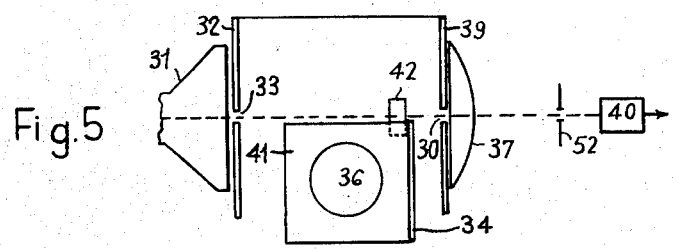
FIGURE 5 is a plan view of the region where the gauging is effected.

FIGURES 3, 4 and 5, illustrate a system for gauging a moving component, again represented as a piston. In this system the component 36 is fed past a vertical slit 33 in an opaque member 32 positioned on the screen of a cathode ray tube 31. The component 36 is carried on a moving platform 41 to which is attached the moving section of a moire fringe grating system 34. The platform is driven by motor 53. The fixed section of the grating and the optical read head 42 is placed so that it will measure accurately the movement of the platform in the form of a series of pulses. Each pulse produced by the grating system is amplified by amplifier 35 and triggers the vertical sweep generator 48 feeding deflection coils 61, to cause the electron beam of the cathode ray tube to scan down the slit 33. This vertical trace is brightened at the points 57 (which are selected in accordance with the component to be gauged) by means of pulses fed to the grid or cathode of the cathode ray tube 31. The pulses are derived from a pulse unit 49 triggered by generator 48, and are fed through a selector unit 50 which is in turn controlled by the programme unit 47 and are then applied to the cathode ray tube through amplifier 51. The bright spots 57 on the trace, focussed by coil 60, therefore indicate the levels at which measurement is to be made on the piston 36. A photomultiplier 40 is arranged behind a screen 39 having a vertical slit 30 in line with the slit 33, and a lens 37 and iris diaphragm 52 are arranged between the screen and the multiplier. With this arrangement the two slits 30 and 33 function as a collimator and allow parallel or near parallel light from the spots 57 to fall on the photomultiplier 40. Each pulse produced from the moire fringe read head 42 represents a known value of movement of the platform 41, e.g. each pulse represents 0.0001 inch.

The output from the photomultiplier 40 is fed through an amplifier 54 to one input of each of a plurality of coincidence gates 55, one of which is provided for each of the levels on the component at which a measurement is to be effected. In the present embodiment, seven such levels are shown represented by the bright spots 57. The coincidence gates are also respectively fed with separate signals derived from the selector unit 50, these signals being respectively timed to occur with the different measuring levels, and in addition the gates are all fed with the output pulses from the moire fringe head through the amplifier 35. A separate counter 56 is connected to the output of each coincidence gate to count the pulses passed by that gate.

Each coincidence gate 55 is arranged so that it only passes pulses from the moire fringe head 42 when the gate is conditioned by the presence of a pulse from selector unit 50 and when no output is being produced from the photomultiplier 40. Thus for any one gauging level, one of the gates is conditioned by a pulse from selector unit 50 and during the period when the piston 36 cuts off the light from falling on the photomultiplier 40, the pulses from the head 42 are passed by that gate to its associated counter 56 to give an indication of the measurement of the component at that point. The correct dimension for the component at that point is fed from the programme unit 47 to the appropriate counter as a series of pulses, which is compared with the count from the moire fringe head 42.

A lower count from the head 42 indicates that the dimension is less than it should be, whilst a higher count indicates that the dimension is greater than the correct value. This information may be used to control a rejector unit 57 to reject the component if it is outside permissible tolerance limits or to operate a suitable indicator. A printer 59 can be operated from the output of the counters 56 to produce a printed record of the measured dimensions on instructions from the programme unit 47. The programme unit may be arranged for either manual or automatic control of the system.

Alternatively, after the counts are completed for each level and during the platform return period, pulses are fed into each counter 56 under control of the programme unit 47 to bring the counts up to the full number which would be fed to the multiplier 40 if the piston 6 were removed. These total counts then represent the correct dimensions. An error in a dimension is then indicated by a high or low count in the same way as described above and may be employed to control a reject indicator or mechanism.

The system according to the present invention provides means for accurately gauging one or several dimensions of a component.

The system also provides facilities for direct programming by means of punched cards or magnetic tape, and may be integrated with automatic control equipment in a production line.

I claim:

1. An optical gauging system for engineering components comprising a light source producing a light beam, means for effecting relative movement in a first direction between said light beam and a component to be gauged such that said light beam is intercepted by said component during said relative movement for a time representative of at least one dimension of said component, means for producing a train of electrical pulses in timed relation to the speed of said relative movement whereby a constant number of pulses is produced per unit of movement, means for producing a predetermined number of pulses equal to the number of said timed pulses which would be produced during the interception of said light beam by a component having a gauged dimension of the correct value, gating means fed with said train of electrical pulses, light sensitive means sensitive to unintercepted light from said beam for producing a signal controlling the number of pulses gated by said gating means during said interception, and means for comparing the latter number with said predetermined number of pulses representing said correct value, and indicating means responsive to any divergence, in excess of allowable tolerance limits, between said number of pulses produced during said interception and said predetermined number of pulses representing said correct value for indicating that the component has an incorrect dimension.

2. A system as claimed in claim 1, comprising two screens positioned between said light source and said light sensitive means, each screen having a slit and acting as a collimator for said light beam which passes from said light source through the slits in said screens to said light sensitive means, and means for positioning the component to be gauged between said two screens during the gauging operation.

3. A system as claimed in claim 2, comprising a gate device controlled by said light sensitive device and a counter device, and wherein said gating means controls the feeding of said train of electrical pulses to said counter device during the period when the light beam is intercepted by said component.

4. A system as claimed in claim 1, comprising a cathode ray tube for producing the light beam.

5. A system as claimed in claim 4 comprising, in addition to the means for effecting relative movement between the light beam and the component in said first direction, means for deflecting the light beam at right-angles to said direction, whereby a multiplicity of dimensions of the component may be gauged substantially simultaneously.

6. A system as claimed in claim 5, in which the component is stationary and means are provided for deflecting the beam of the cathode ray tube both vertically and horizontally to produce a scanning raster by means of which gauging may be effected substantially simultaneously at different levels corresponding to different scanning lines.

7. A system as claimed in claim 5, including means for deflecting the cathode ray beam in a line perpendicular to the dimensions to be gauged and means for moving the component mechanically in a direction transverse to the deflection of the cathode ray beam whereby a multiplicity of dimensions may be gauged substantially simultaneously at different positions along the scanning line.

8. A system as claimed in claim 1, including means for detecting the number of pulses produced while the light beam is traversing a dimension of the component to be gauged, by producing a fixed number of pulses during each complete cycle of relative movement between the component and the light beam in the direction of the dimension to be gauged, and said gating means gates out the pulses produced while the light beam is cut off from the light sensitive means by the component interposed therebetween.

9. A system as claimed in claim 8, including means connected to said gating means for adding said predetermined number of pulses corresponding ot the required dimension to the number of pulses passed by said gating means during the complete scanning sweep across the dimension to be gauged.

10. A system as claimed is claim 8, including means for comparing the number of pulses produced whilst the light beam is cut off from the light sensitive means by the component with said predetermined number of pulses representing the desired dimension.

11. A gauging system for engineering components comprising a light spot and a component to be gauged, means for effecting relative movement between said light spot and said component so that the light spot effectively scans the dimension of the component to be gauged, a light sensitive device responsive to light from said light spot and arranged so that light from the light spot is cut off from the light sensitive device by the component during the gauging of a dimension of the component, means for producing calibrating pulses in timed relation with the speed of scanning movement, means for feeding the calibrating pulses to a counter only during the period when light from the spot is cut off from the light sensitive device, means for producing a predetermined number of pulses representing the desired dimension of the component at that gauging point, means for comparing the number of pulses received by the counter with said predetermined number of pulses representing the desired dimension of the component at that gauging point and means for producing an indication if the comparison between the two sets of pulses differs by more than a predetermined number.

12. An optical gauging system for gauging a stationary engineering component, comprising a cathode ray tube having two scanning beams, a scale comprising consecutively spaced opaque markings on the screen of said cathode ray tube, a first photosensitive device, a second photosensitive device, means for causing one of said scanning beams to scan repetitively across said scale on the screen of the cathode ray tube to produce a series of calibration pulses by means of the light interrupted by said opaque markings falling on said first photosensitive device, means for causing the other of said scanning beams to produce a raster synchronised with the first beam and the light from which is allowed to fall on said second photosensitive device, except when the light is cut off by the part of the component to be gauged being positioned between the screen of the cathode ray tube and the photosensitive device, a first gate circuit fed by the outputs from the two photosensitive devices, said first gate circuit opening to pass the calibrating pulses so long as light from the raster falls upon the second photosensitive device, a second gate circuit passing the pulses passed by the first gate circuit, a counter fed from the second gate circuit, means for opening said second gate circuit only during the scan in which a measurement of the component is being taken and means for generating and feeding pulses to the counter equal in number to the number of calibrating pulses which should be cut off by the first gate during the gating operation if the dimension being gauged is correct.

13. An optical gauging system for an engineering component comprising a carrier for the component, a cathode ray tube, means for moving the component and carrier past the screen of said cathode ray tube, a scale on said carrier, a reading device associated with said scale to produce calibrating pulses as the carrier moves, means for causing said calibrating pulses to trigger a trace on the cathode ray tube normal to the direction of movement of the carrier, means coupled to said cathode ray tube for brightening said trace to produce a bright spot opposite each part of the component at a separate level where a measurement is to be effected, a light sensitive device arranged to receive light from the brightened portions of the trace except during the period or periods of measurement when these portions of the trace are obscured by the part of the component then being measured, a gate circuit for each of the separate levels at which measurement is to be effected, means for rendering each gate circuit operative only during the period when measurement is being effected at that level to pass the calibrating pulses, means for producing a predetermined number of pulses which is equal to the number of calibrating pulses which should be passed by the gate if the component being gauged has the desired dimension at that level, and means for comparing the calibrating pulses passed by each gate with said predetermined number of pulses.

14. A system as claimed in claim 13, wherein the gates comprise coincidence gates and means coupled to said light sensitive device and said gates for rendering said coincidence gates operative to pass the calibrating pulses when the light from the brightened spot representing the level at which the measurement is being effected is cut off from the light sensitive device by the part of the component then being measured.

15. A system as claimed in claim 13, wherein the predetermined number of pulses with which the calibrating pulses are compared are produced in a programme unit and a pulse selector circuit is controlled by said programme unit and in turn controls the appropriate gate to operate at the time at which measurement is being effected on any one of the different levels of the component being gauged.

16. A system as claimed in claim 13, wherein said reading device is a moire fringe device for producing the calibrating pulses.

17. A system as claimed in claim 13, further comprising a light collimating device consisting of a slit adjacent the face of the cathode ray tube and a further slit positioned between the component to be gauged and the light sensitive device.

18. A system as claimed in claim 13, including a printing device connected to said pulse comparing means and operated after the measurement of a part of the component has been effected to produce a print record of the measurement.

References Cited by the Examiner
UNITED STATES PATENTS

| | | | |
|---|---|---|---|
| 2,645,971 | 7/1953 | Herbst | 88—14 |
| 2,674,915 | 4/1954 | Anderson | 88—14 |
| 2,880,512 | 4/1959 | Fenemore et al. | 88—14 |
| 2,934,824 | 5/1960 | Braybrook et al. | 88—14 |
| 2,954,266 | 9/1960 | Danielson et al. | 88—14 |
| 3,035,478 | 5/1962 | Laycak | 88—14 |

JEWELL H. PEDERSEN, *Primary Examiner.*

FREDERICK M. STRADER, *Examiner.*